United States Patent
Lou et al.

(10) Patent No.: US 8,414,026 B1
(45) Date of Patent: Apr. 9, 2013

(54) MOBILE CREW RESTRAINT AND SEATING SYSTEM

(75) Inventors: Ken-An Lou, Phoenix, AZ (US); Matthew Luster, Mesa, AZ (US); Christina Hadder, Decatur, AL (US)

(73) Assignee: Armorworks Enterprises LLC, Chandler, AZ (US)

( * ) Notice: Subject to any disclaimer, the term of this patent is extended or adjusted under 35 U.S.C. 154(b) by 303 days.

(21) Appl. No.: 13/042,630

(22) Filed: Mar. 8, 2011

Related U.S. Application Data

(60) Provisional application No. 61/314,913, filed on Mar. 17, 2010.

(51) Int. Cl.
*B60R 22/06* (2006.01)
(52) U.S. Cl.
USPC .................. 280/804; 296/65.13; 296/68.1
(58) Field of Classification Search .................. 280/804, 280/805; 296/65.13, 68.1; 248/503.1
See application file for complete search history.

(56) References Cited

U.S. PATENT DOCUMENTS

| | | | |
|---|---|---|---|
| 3,522,918 A | 8/1970 | Wrighton | |
| 3,868,143 A * | 2/1975 | Reilly | 297/216.17 |
| 4,474,347 A * | 10/1984 | Mazelsky | 244/122 R |
| 4,846,498 A * | 7/1989 | Fohl | 280/801.2 |
| 4,967,985 A | 11/1990 | Deakin | |
| 5,046,687 A | 9/1991 | Herndon | |
| 5,294,150 A | 3/1994 | Steffens, Jr. | |
| 5,746,395 A | 5/1998 | Peck | |
| 6,135,380 A | 10/2000 | Brown | |
| 6,935,819 B2 * | 8/2005 | Squyres | 410/104 |
| 7,011,338 B2 | 3/2006 | Midorikawa | |
| 7,513,558 B2 | 4/2009 | Hansen | |
| 7,758,095 B2 * | 7/2010 | Elhanany | 296/63 |
| 8,091,944 B2 * | 1/2012 | Elhanany | 296/63 |

OTHER PUBLICATIONS

Roger Podob, Mobile Aircrew Restraint System—MARS, Proceedings of the Forty Third Annual SAFE Association Symposium, Oct. 24-26, 2005, SAFE Association, Post Office Box 130, Creswell, OR 97426-0130.

* cited by examiner

*Primary Examiner* — Toan To
(74) *Attorney, Agent, or Firm* — James L. Farmer

(57) ABSTRACT

Methods and apparatus are provided for a safety restraint system for use inside a vehicle compartment by a mobile occupant or crew member. In one preferred embodiment the safety restraint system comprises an upper trolley and track system connected to the ceiling of the vehicle compartment, a lower trolley and track system connected to the floor of the compartment, and a lockable inertia reel with an extensible strap pivotally attached to the upper trolley. The restraint system further comprises an upper tether connected at an upper end to the end of the inertia reel extensible strap, and at the other end to a harness worn by the occupant. The system may further include a lower tether connected at one end to the lower trolley, and connectable at the other end to the occupant's harness.

29 Claims, 15 Drawing Sheets

MOBILE CREW RESTRAINT AND SEATING SYSTEM

This invention was made with government support under contract no. FA8650-08-M-6880 awarded by the U.S. Air Force Materiel Command. The government has certain rights in the invention.

TECHNICAL FIELD AND BACKGROUND

The present invention generally relates to vehicle restraint systems, and more particularly relates to crashworthy restraint systems for use by mobile crew members in air, ground, and water borne vehicles.

Crew members in vehicle crew compartments often require mobility to perform mission duties, while still being provided with adequate protection in the event of a severe maneuver, crash, or other impact event. For example, large special operations or combat search and rescue helicopters are required to perform a variety of missions. The mission duties of the helicopter crew members (e.g. gunners, flight engineers, load masters) can require that the crew members be seated, standing, kneeling, or moving about. Crew cabin seating systems can afford a substantial degree of protection, however such seating systems cannot easily be moved or removed during flight. In addition, the seating systems naturally limit the crewmembers' range of motion, which hinders the ability to perform necessary duties, for example during troop transport, or cargo loading and unloading. Consequently many crew stations currently do not have any type of seating system, which results in limited or no impact protection.

In many vehicle compartments, simple tethers connecting the crew member to discrete attachment points in the crew compartment are often used for mobile crew protection. Crew restraint tethers are typically adjustable, and preferably kept short enough to prevent the crew member from falling out of the vehicle. However mobility is limited by the length of the tether, often preventing access by the crew member to areas of the vehicle compartment necessary for performance of mission duties. In such situations the tether must be detached from the vehicle attachment point and re-attached at a different location that affords the crew member access to the particular location, leaving the crew member unprotected while the tether is being moved. Thus a crew member is at a substantially increased risk of injury when moving a tether attachment from one location to another. Also, while a tether may be effective at preventing crew from falling out of the compartment, it does little or nothing to prevent impact with the inside of the compartment. Such lack of protection can result in severe injuries to the spine, torso, and head from impact with the vehicle structure.

An alternative to a simple tether is a device known as a Mobile Aircrew Restraint System, or "MARS". One such device sold by Conax Florida Corporation for use in helicopter crew compartments comprises a retractor reel holding a Kevlar® strap that can be clipped to a safety belt worn by a crew member. The device may be pivotally mounted to the ceiling of the compartment, allowing the crew member to move about in the compartment in any direction. The retractor reel is an inertia device that allows the strap to freely pay out under normal conditions, but locks when the strap accelerates rapidly to prevent crew from being ejected. Although such a system improves mobility over a simple tether, it likewise suffers from an inability to adequately protect against crew member impact with the vehicle structure.

What is needed is a an innovative mobile crew crashworthy restraint system that allows crewmembers the freedom to perform the majority of their tasks, while preventing injury due to impact with the vehicle compartment. Other desirable features and characteristics of the present invention will become apparent from the subsequent detailed description and the appended claims, taken in conjunction with the accompanying drawings and the foregoing technical field and background.

SUMMARY

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment" does not necessarily refer to the same embodiment, although it may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a safety restraint system for use by a mobile occupant inside a vehicle compartment. The exemplary safety restraint comprises an upper track connected to the ceiling of the compartment, an upper trolley connected to and adapted for linear movement along the upper track, and an upper tether connected at an upper end to the upper trolley and connectable at the other end to a harness worn by the occupant.

According to another exemplary embodiment, the present disclosure comprises a safety restraint system for use by a mobile occupant inside a vehicle compartment, comprising an upper trolley and track system connected to the ceiling of the vehicle compartment, and a lower trolley and track system connected to the floor of the floor compartment. The system further includes a lockable inertia reel pivotally attached to the upper trolley, the inertia reel including an extensible strap. An upper tether is connected at an upper end to the end of the inertia reel extensible strap, and connectable at the other end to a harness worn by the occupant. A lower tether is connected at one end to the lower trolley, and connectable at the other end to the harness worn by the occupant.

According to another exemplary embodiment, the present disclosure comprises an energy attenuating safety restraint system for use by a mobile occupant inside a vehicle compartment. The energy attenuating restraint system comprises an upper track connected to the ceiling of the compartment, and an upper trolley connected to and adapted for linear movement along the upper track. An upper tether is connected at an upper end to the upper trolley, and connectable at the other end to a harness worn by the occupant. An energy attenuating (EA) device is disposed between the occupant and the ceiling of the vehicle compartment.

Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

The present invention will hereinafter be described in conjunction with the following drawing figures, wherein like numerals denote like elements, and wherein.

DETAILED DESCRIPTION

The present invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
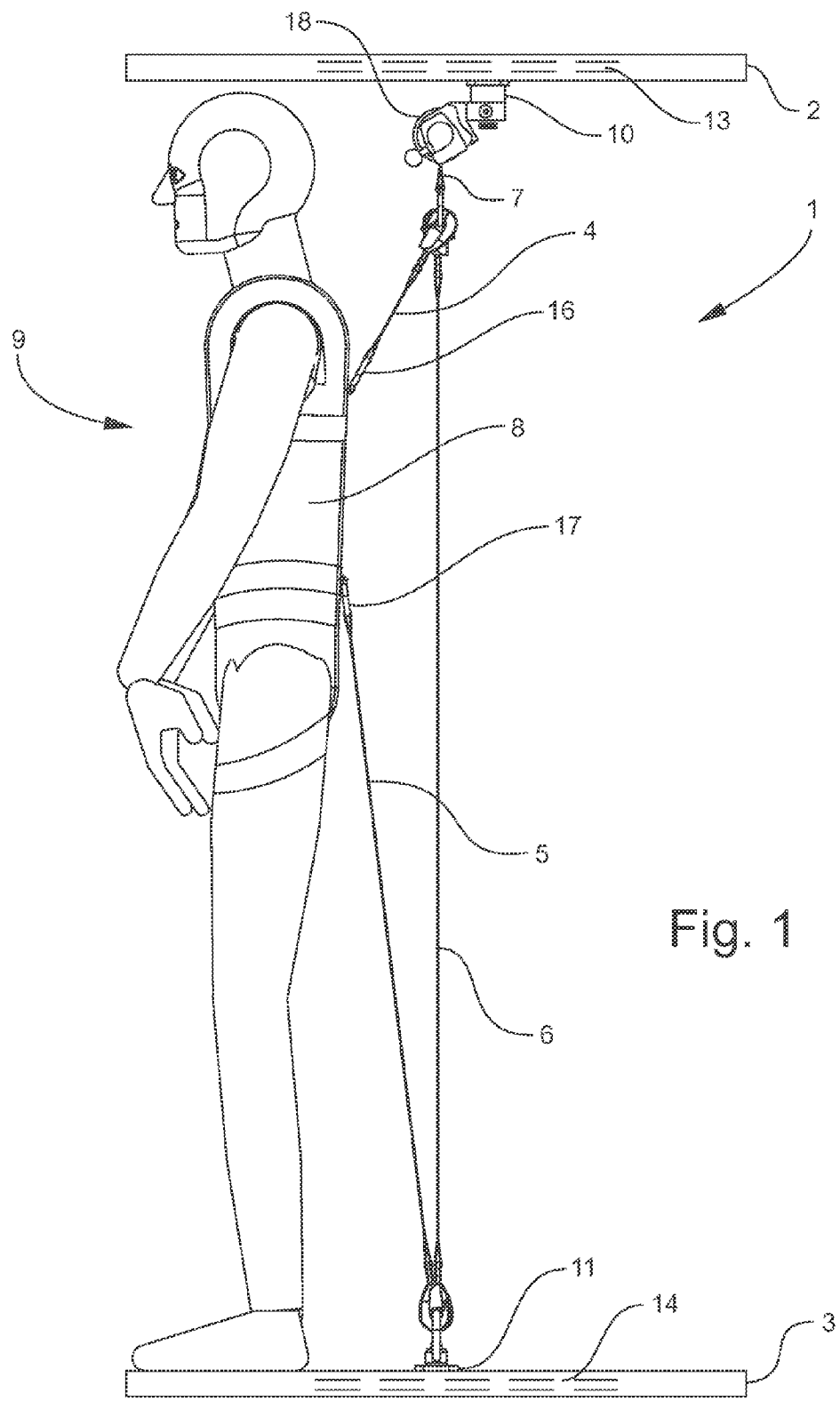
FIG. 1 is a side view of a mobile crew restraint system in accordance with the present invention attached to a standing occupant.

Referring now to FIG. 1, the present invention comprises generally a mobile occupant restraint system 1 disposed between the ceiling 2 and floor 3 of a vehicle compartment. The vehicle compartment could be the interior of any large vehicle or aircraft, such as a troop transport, a large helicopter, cargo plane, or watercraft, with an open compartment intended for use by mobile crew members. The restraint system 1 in the embodiment of FIG. 1 comprises a system of cables or straps 4, 5, 6 and 7, a reel 18, and a harness 8 for restraining and supporting an occupant 9 within the vehicle compartment. The restraint system 1 is moveable relative to the ceiling 2 and floor 3 to facilitate occupant mobility. In one preferred embodiment the restraint system 1 is moveably connected to ceiling 2 and floor 3 via upper and lower trolleys 10 and 11 and linear tracks 13 and 14. As will be described in greater detail below, trolleys 10 and 11 are preferably configured to move freely along the linear tracks 13, 14, as well as lock in place at any point along the tracks; with locking obtained either manually by action of the occupant, or automatically under certain predefined emergency conditions.

The system of straps comprises an upper tether 4, a lower tether 5, a locking strap 6, and a tensioning strap 7. Upper tether 4 is attached at one end to an upper back portion of the occupant's harness 8, and at the other end to the end of tensioning strap 7 that extends downward from reel 18. Lower tether 5 is attached to a lower back portion of the harness 8 at one end, and to the lower trolley 11 at the other end. The locking strap 6 is attached at one end to lower trolley 11 with lower tether 5, and at the other end to tensioning strap 7 with upper tether 4. The straps may be any high strength cable or strap material, and are more preferably a woven nylon safety strap material with a breaking strength of at least 2000 pounds. One suitable commercially available product is sold by Lowy under the designation "1.75 inch WB8U Nylon webbing" with an advertized breaking strength of 4000 pounds.

Trolley and Track System

Figure 2:
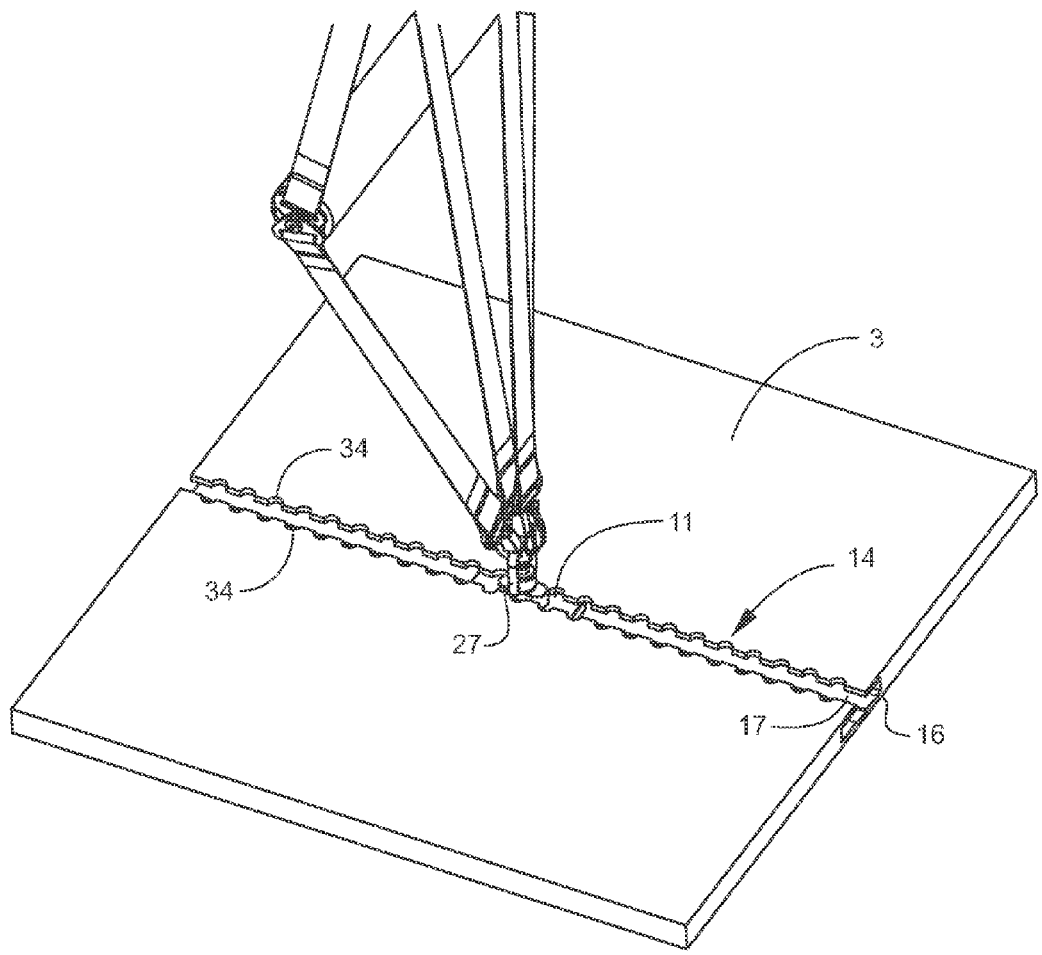
FIG. 2 is a perspective view of the lower portion of the restraint system of FIG. 1 showing the floor track and lower trolley.

Referring now to FIGS. 2 through 7, the trolley and track systems of the present invention will be described in greater detail. FIG. 2 depicts a portion of a floor 3 of a vehicle compartment containing a track 14 and lower trolley 11. It should be noted that although the track and trolley systems of the present invention are described herein in terms of the vehicle floor 3 and floor track 14, the same description equally applies to the ceiling track and trolley systems. Accordingly, track 14 (or track 13) comprises generally a channel 16 through floor 3 (or ceiling 2), with an open slot 17 in the top of the channel. Track 14 may be an integral part of a vehicle compartment floor, or an adapted feature to an existing compartment floor, for example by embedding a section or strip of flooring containing track 14. Alternatively track 14 may be incorporated into an overlay that sits atop the existing floor. In any case, floor 3 is preferably substantially smooth, with the exception of the open slot 17, to avoid introducing trip hazards.

Figure 3:
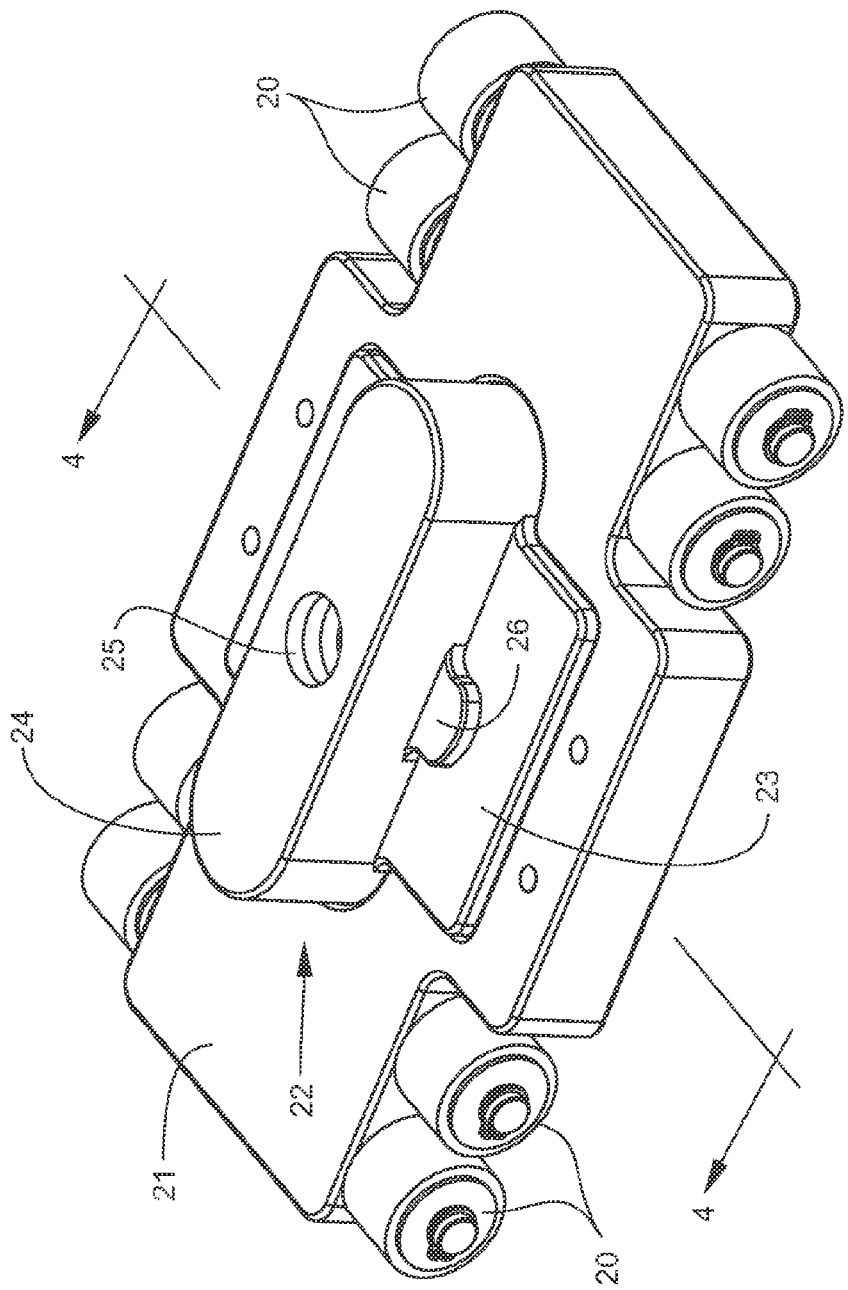
FIG. 3 is a perspective view of a lockable trolley in accordance with the invention.

Referring to FIG. 3, an exemplary trolley 11 comprises a flat, elongated body 21 supported by a series of wheels 20 disposed along its sides. The diameter of wheels 20 is preferably larger than the thickness of body 21 to ensure that only the wheels and not the body contact the surfaces of channel 16 when the trolley is unlocked. Trolley 11 preferably further includes a moveable locking feature configured to engage a corresponding receptacle in the channel 16. In one exemplary embodiment the moveable locking feature comprises a vertically moveable locking block 22 disposed within a central cavity of body 21, the locking block comprising a base portion 23, a boss 24 with a threaded central hole 25, and raised lobes 26 on either side of boss 24. As best seen in FIG. 2, the trolley body 21 with wheels 20 is configured to reside entirely within channel 16, while boss 24 of locking block 22 protrudes from channel 16 into slot 17. Boss 24 is slightly narrower than slot 17 such that it acts as a guide keeping the trolley 11 centered laterally as it rolls within track 14. The strap system 1 is attachable to trolley 11 using, for example, a swivel coupling 27 bolted to the boss 24 via threaded hole 25.

Figure 4:
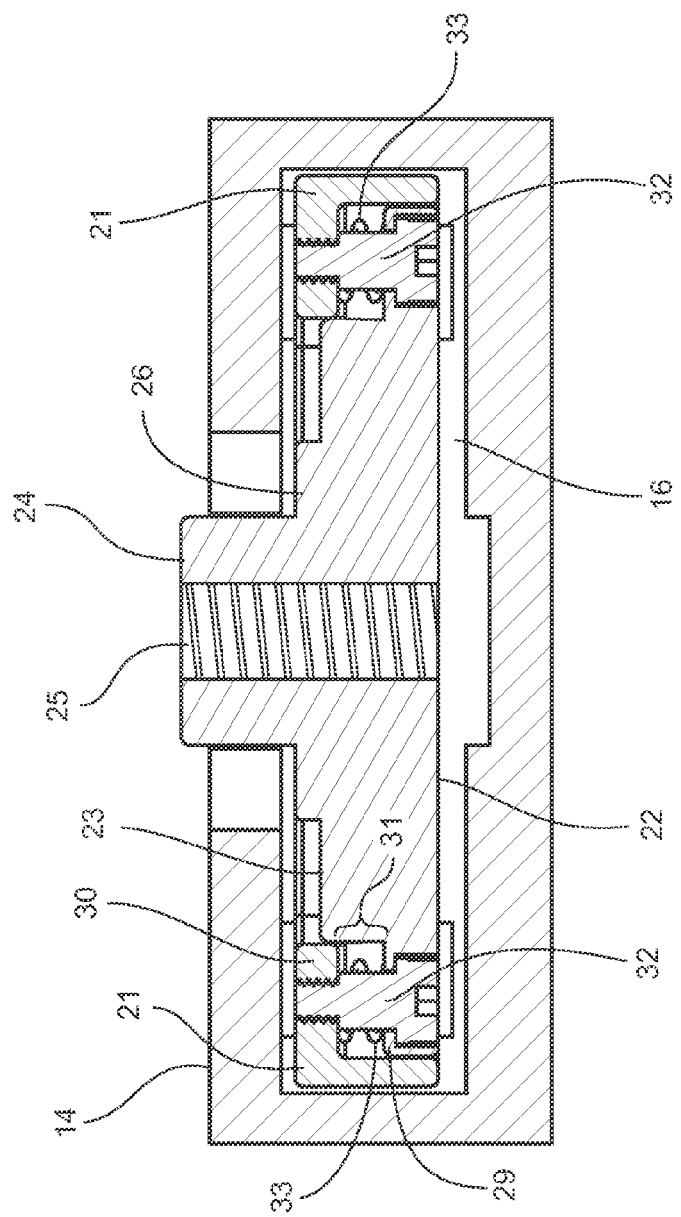
FIG. 4 is a cross section of the trolley of FIG. 3 shown in an unlocked position.

FIG. 4 represents a cross section, taken through the plane A-A noted in FIG. 2, of a trolley 11 in an unlocked configuration disposed within a track 14 of a floor 3. As can be seen, an outer edge portion 29 of the base 23 of vertically moveable locking block 22 extends beneath an overlapping portion 30 of trolley body 21, defining a gap 31 therebetween. A series of screws 32 threaded into outer portion 30 of trolley body 21 adjustably support locking block 22. More specifically, the heads of screws 32 act as a limit stop to define a lower position of locking block 22 relative to trolley body 21, while allowing locking block 22 to freely move upward relative to body 21. A series of compression springs 33 in gap 31 urge block 22 downward, away from trolley body 21 and against the heads of screws 32, as depicted in FIG. 4. In this position, the tops of lobes 26 are substantially flush with the top of trolley body 21, and the bottom of locking block 22 is substantially flush with the bottom of trolley body 21. Thus only the wheels 20 are in contact with the inside of channel 16, and trolley 11 is free to roll along the track.

Figure 5:
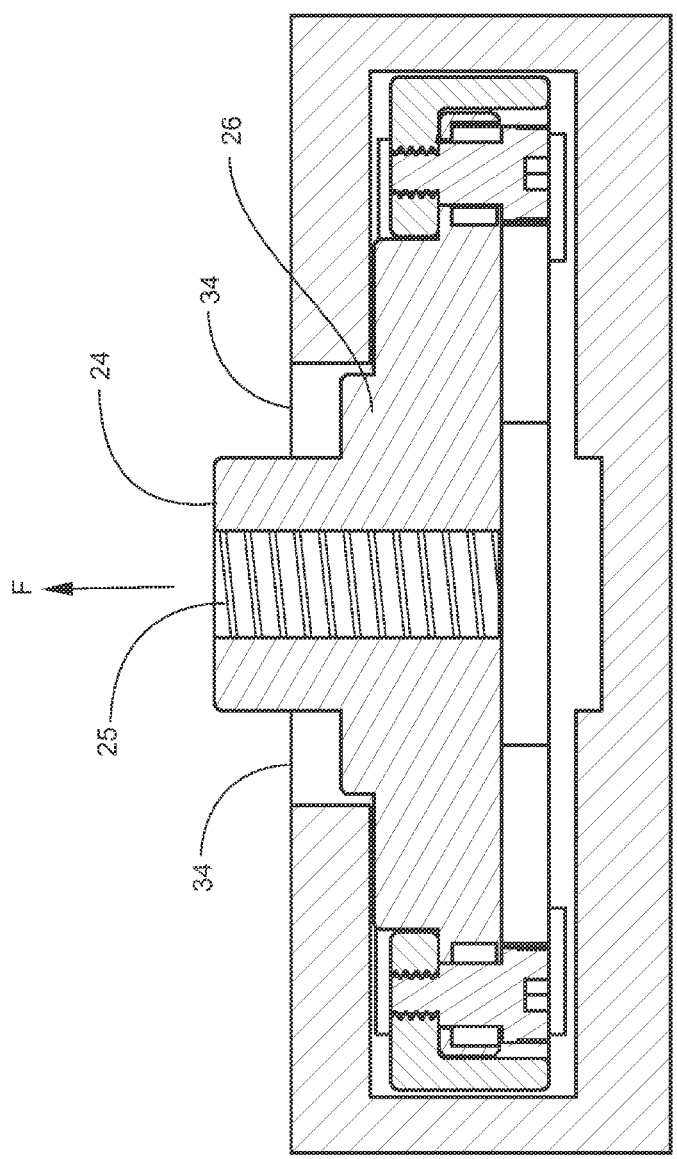
FIG. 5 is another cross section of the trolley of FIG. 3 shown in a locked position.

FIG. 5 represents another cross section like that of FIG. 4, this time with the trolley in a locked configuration. In particular, locking block 22 has moved upward relative to trolley body 21, as compared to FIG. 4, closing gap 31. The upward movement of block 22 is obtained through application of an upward force "F" from the straps of the restrain system sufficient to overcome the opposing force of springs 33. The edges of slot 17 (see FIG. 2) of track 14 define a series of scallops 34 symmetrically arranged in opposing pairs. Each pair of scallops 34 is configured to receive the raised lobes 26 of locking body 22. With block 22 pulled upward as shown in FIG. 5, lobes 26 project up into a pair of scallops 34 in slot 17, thus locking trolley 11 in position within track 14. The trolley will remain in the locked position as long as the upward force F applied to the trolley through boss 24 exceeds the opposing force of springs 32. Once the upward force F is released, the springs 33 push the locking block 22 back down, withdrawing the lobes 26 from scallops 34, and thus unlocking the trolley.

Figure 6:
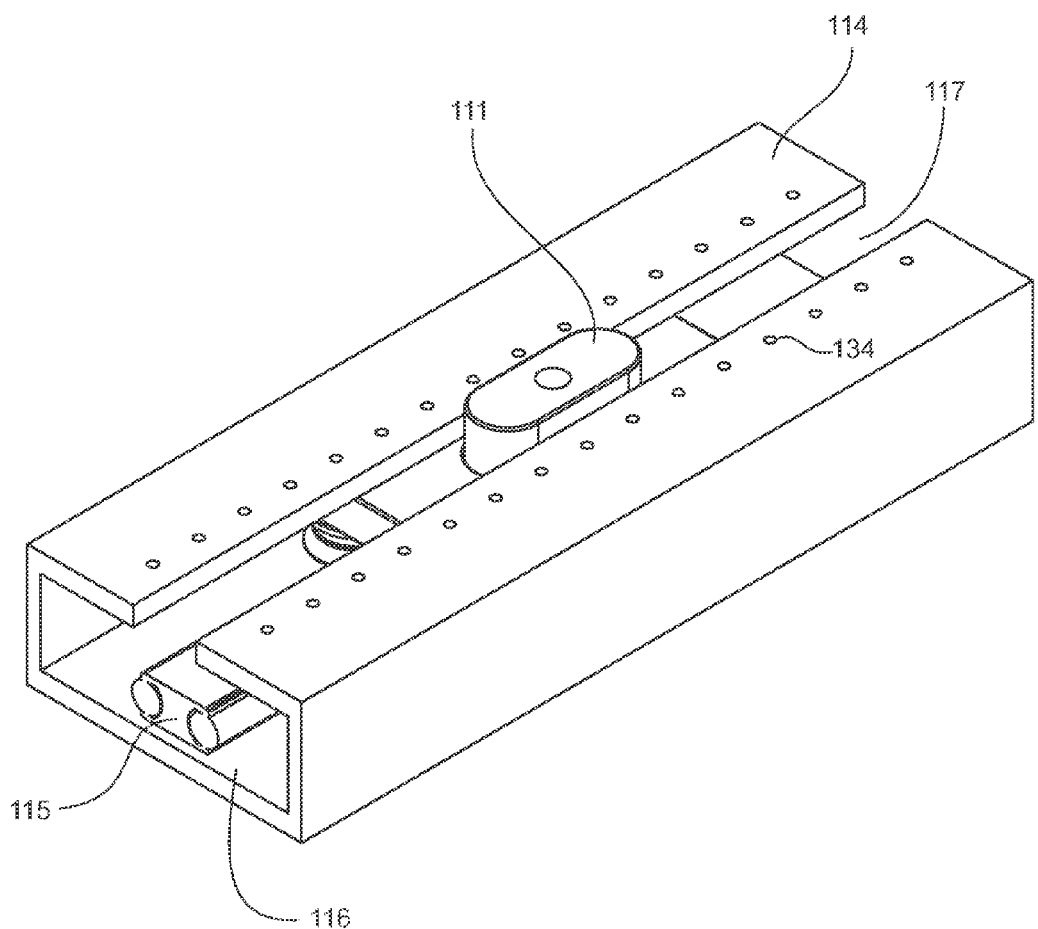
FIG. 6 is a perspective view of an alternative track and trolley system utilizing a guide rail.
Figure 7:
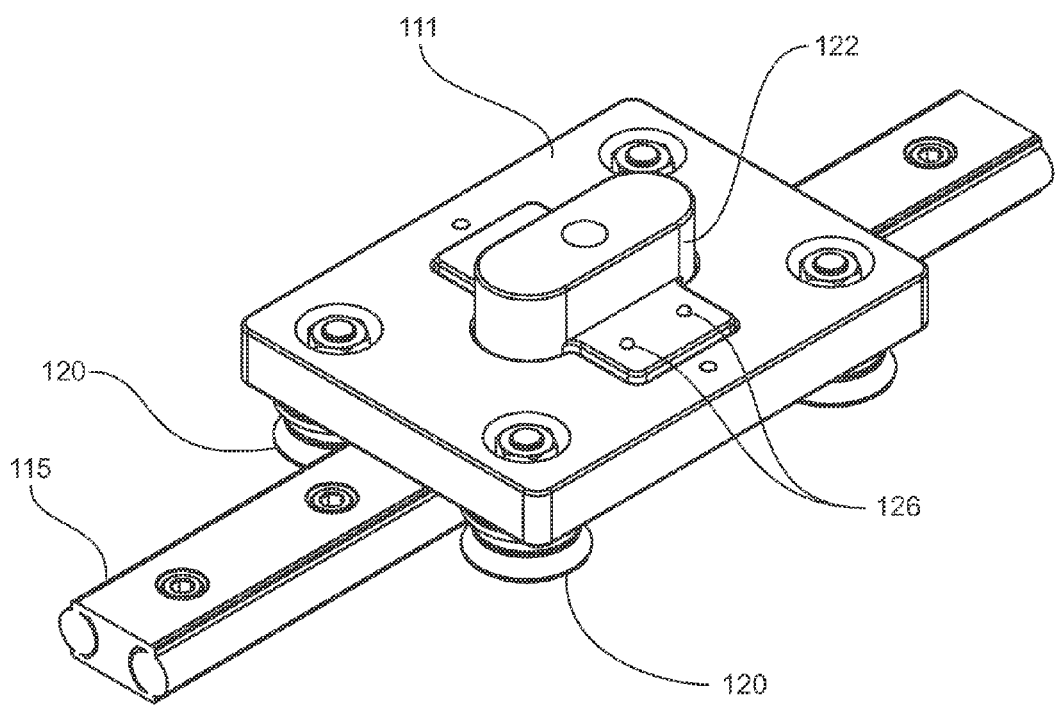
FIG. 7 is a perspective view of only the alternative trolley and guide rail portion of FIG. 6.

FIGS. 6 and 7 illustrate another exemplary trolley and track system in accordance with the present invention. As in the previously described embodiment, a trolley 111 resides in a linear track 114 incorporated in a floor or ceiling of a vehicle compartment, the track 114 comprising a channel 116 with an open slot 117. Instead of wheels however, the exemplary trolley 111 is supported from underneath by a series of rollers 120 and a guide rail 115 mounted to the bottom of channel 116. In addition, the lobes and scallops of the previously described embodiment are replaced by locking pins 126, and a series of evenly spaced holes 134 in track 114 to receive pins 126. Otherwise the trolley and track systems are structurally and functionally substantially identical.

Harness

Figure 8:
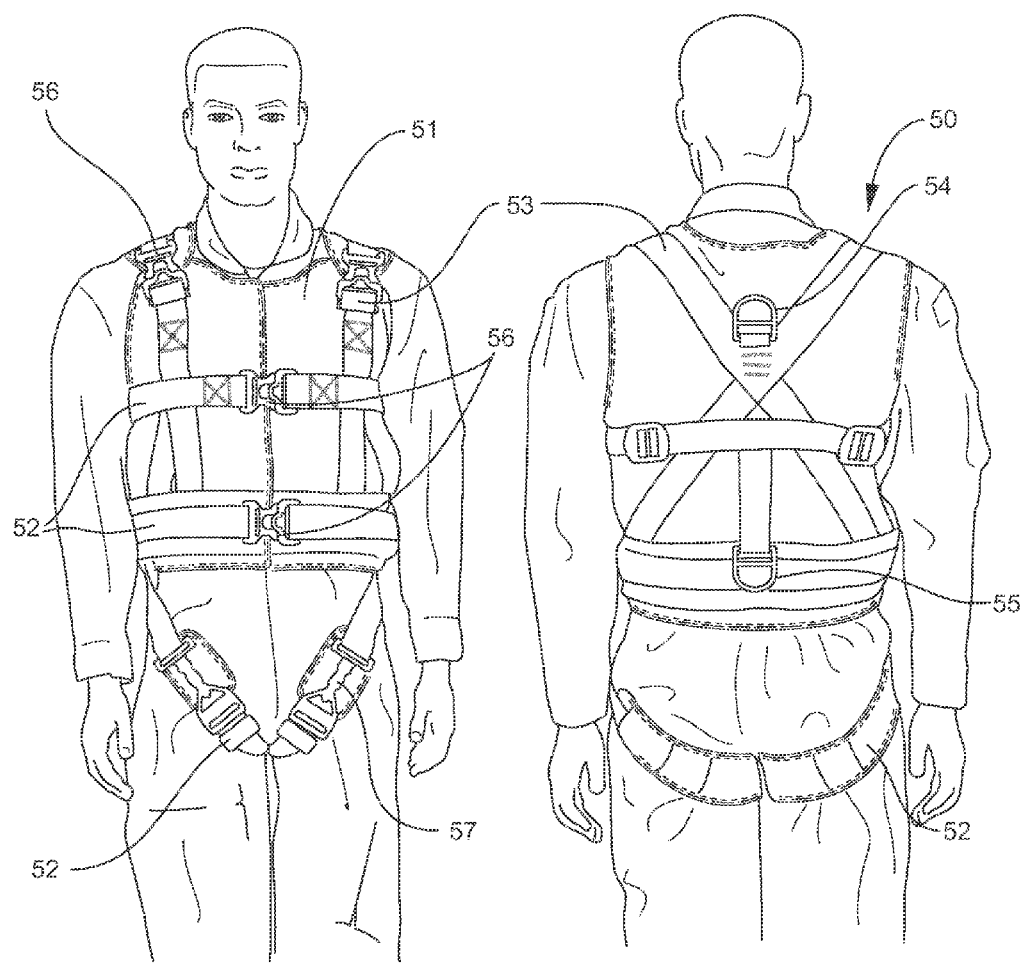
FIG. 8 depicts front and back views of an exemplary harness for use in conjunction with the restraint system.

FIG. 8 illustrates an exemplary body harness 50 in accordance with the present invention. Harness 50 comprises a vest portion 51 with adjustable chest and shoulder straps 52, 53. The vest portion 51 is preferably made from a high strength material such as nylon, and may further incorporate ballistic or flame resistant materials such as Kevlar® or Nomex®. In one embodiment the vest portion 51 is provided with pockets for insertion of ballistic or flame retardant inserts. Harness 50 may also include leg straps 52 to provide leg support and to offset some of the load applied to the occupant's torso by vest portion 51. Upper and lower tether attachment rings 54, 55 are provided on the back of vest portion for attachment to upper and lower tethers 4, 5 of the restraint system 1. The harness 50 is preferably designed to withstand a standard parachute harness design load (i.e. at least 1,800 lbs) applied through either of rings 54, 55. Quick release buckles 56, 57 may be incorporated to facilitate rapid evacuation of harness 50 in an emergency situation.

Inertia Reel

Reel 18 is minimally an inertia type reel with a retraction spring and inertia lock mechanism that allows tensioning strap 7 to freely pay out under normal circumstances, and lock if pay out of strap 7 exceeds a predefined acceleration threshold. The ability of the reel 18 to pay out strap 7 allows the occupant to bend over or squat down as may be necessary or convenient for carrying out normal duties. The retraction spring portion maintains a constant slight tension in strap 7 to remove any slack. The present invention contemplates a restraint system that provides enough freedom of movement for the occupant to preferably at least reach down and touch the floor without being pulled up short by the restraint. Accordingly reel 18 should have sufficient capacity for freely spooling out several feet of webbing 7. Additionally, reel 18 is preferably pivotally attached to upper trolley 10 such that it can freely rotate and follow the movement of an occupant without the straps twisting or tangling. One such suitable product is commercially available under the name "MA-16 Inertia Reel" through Conax Florida Corporation. The MA-16 reel can be customized with a range of webbing lengths, and includes a swivel mount that is configured for attachment to a vehicle ceiling.

Powered Retraction

Although the restraint system allows an occupant comparative freedom to move about a vehicle compartment without risk of falling out, the crash protection features of the present invention are greatly enhanced when the occupant is in a "crash ready" position. As will be discussed in greater detail below, a preferred embodiment of the restraint system incorporates an energy absorbing device designed to break the fall of an occupant in a crash. With such devices it is important that the occupant be in a proper position to effectively utilize the full stroke of the device. A "crash ready" position in accordance with the present invention is essentially as depicted in FIG. 1, wherein the occupant is standing relatively close to the trolleys, and there is little or no slack in tethers 4 and 5. The restraint system of the present invention preferably includes a power retraction device in conjunction with the inertia reel to quickly and positively return an occupant from an unprotected position, such as sitting or kneeling, to the "crash ready" position of FIG. 1.

In one embodiment the power retraction device may comprise a haul back reel of the type used in conjunction with aircraft ejection seats for rapidly and forcefully restraining the pilot prior to ejection. Ejection seat haul back reels are typically powered by an explosive gas generator that must be recharged or replaced after each use. In a more preferred embodiment, the power retraction device of the present invention utilizes a suitable high torque electric motor for repeated use without need for interim maintenance or recharging. The power retraction device may further include a mechanical or electrical clutching mechanism configured to engage and disengage the power source from the reel, such that under normal circumstances the inertia reel operates without interference from the powered retraction portion. The power retraction feature may be an add-on to an inertia reel such as the previously mentioned MA-16 reel, or more preferably an integral portion of a combination reel that incorporates both the inertia reel and power retraction function.

The power retraction device preferably further incorporates the ability to adjust the retraction power level. In emergency situations such as an impending vehicle crash, it is desirable to move an occupant to a crash ready position as quickly as possible. However, a power level suitable for safely and rapidly moving one occupant may result in injury to another occupant that weighs less. Accordingly the present invention contemplates manual or automatic power level adjustability of the power retraction device. For example in one embodiment the power retraction device comprises a DC electric motor with manual control for adjustably setting the maximum motor torque level. In another exemplary embodiment, the restraint system includes a feedback control system for sensing an occupant's weight and adjusting the torque of the power retraction device accordingly. Alternatively the power retraction device continuously monitors the acceleration rate of tensioning strap 7 and correspondingly adjusts motor torque to maintain the acceleration at or below a predefined safe level.

A power retraction device in accordance with the present invention can preferably be activated either manually by an occupant, or automatically in response to an electronic signal initiated by various onboard sensing systems. Manual controls may include for example a first switch on the occupant's harness 50 to activate the power retraction device, and a second switch to manually deactivate it. Should an occupant anticipate that a crash or other high loading event is imminent, and wish to move as quickly as possible to a crash ready position, the powered retraction could be activated manually. Alternatively, if an occupant determined that the powered retraction is not needed or presents an unwanted hazard in a particular situation, the device could be manually deactivated. For example, a helicopter crew member anticipating a crash may determine that lying prone on the floor of the crew compartment provides the best opportunity for survival. In that situation the ability to manually deactivate the power retraction device, or to override any sensor initiated activation signal, would be advantageous.

Figure 9:
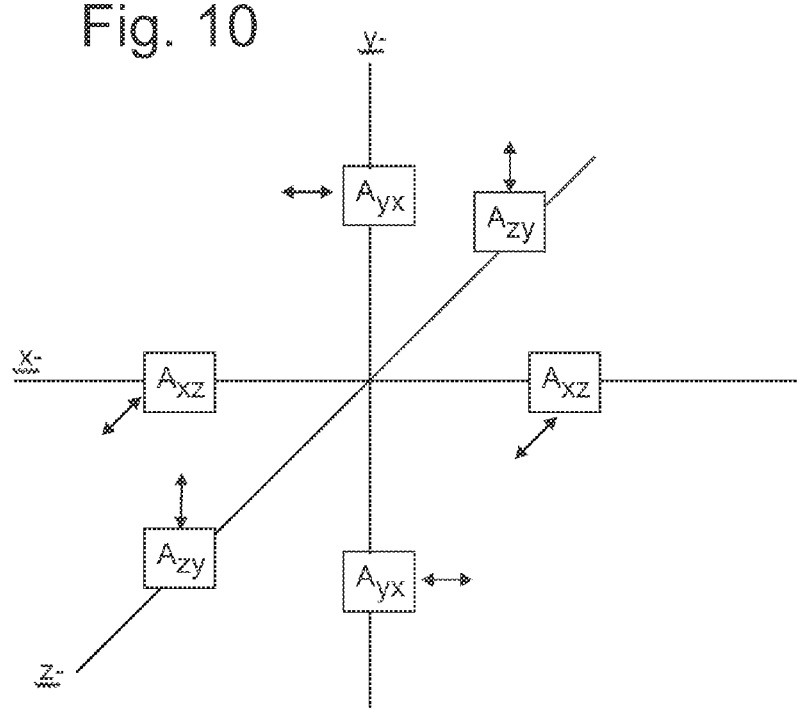
FIG. 9 is a schematic representation of an accelerometer array for use in conjunction with a power retraction feature of the restraint system.

The restraint system preferably also includes one or more sensing systems for detecting conditions that warrant activation of the power retraction device. In one embodiment accelerometers are used to detect motion conditions likely to result in injury to the vehicle occupants. FIG. 9 is a schematic illustration of an exemplary array of linear accelerometers arranged about three axes, x, y, and z. The accelerometers are preferably grouped in pairs and separated by a known distance. For a given accelerometer, $A_{jk}$, "j" refers to the axis on which the accelerometer is mounted, and "k" refers to the direction in which the accelerometer detects linear acceleration. In such a configuration, both linear and rotational accelerations may be determined from the linear accelerometer measurements. Considering for example the pair of accelerometers $A_{xz}$ located on the "x" axis, the signal from either one may be converted directly to a linear acceleration in the "z" direction. Using the same two accelerometers, and taking into account the known separation distance, an angular acceleration about the "y" axis can also be calculated. The angular acceleration is based on the difference between the two accelerometer signals.

A sensor array such as that of FIG. 9 is preferably mounted in a vehicle at one centralized location relative to the restraint system 1, such as on the upper trolley 10. When the vehicle motion is substantially linear, the linear acceleration data from a single location sensor array can be utilized to effectively represent conditions anywhere in the vehicle compartment. When the vehicle motion includes a rotational component, the rotational motion information from the single sensor array can be advantageously combined with the linear motion information to infer the forces acting on the occupants at distant points in the workspace. Although a system based on linear accelerometers has been described, a sensor array may also include angular rate (Gyro) sensors. Angular rate sensors can be effectively employed for improved computation of accelerations on remotely positioned crew members.

Figure 10:
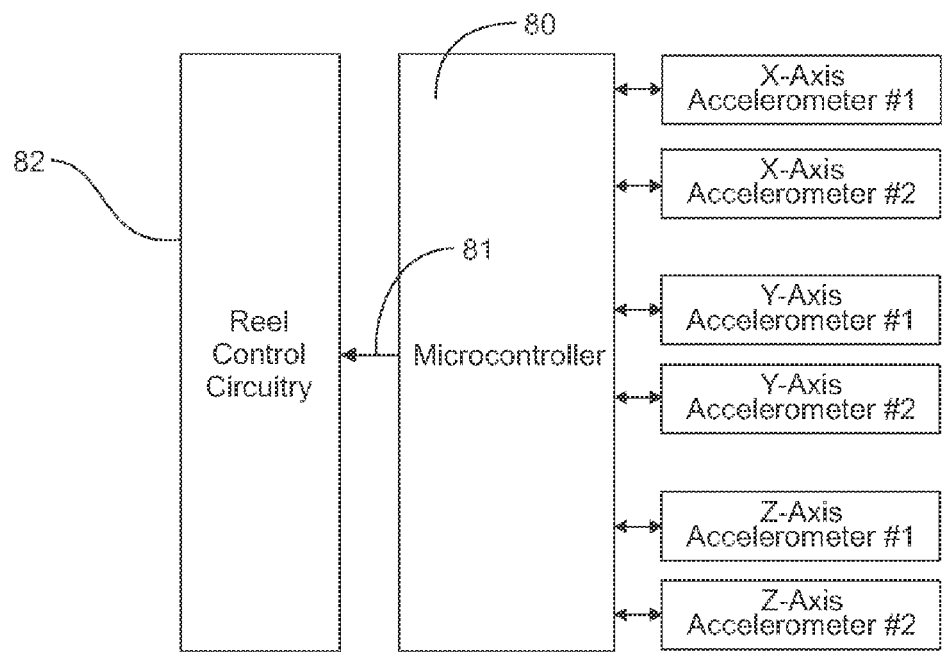
FIG. 10 is a schematic representation of a control system utilizing an accelerometer array such as that of FIG. 9.

FIG. 10 is a block diagram for a system to detect vehicle motions based on an array of accelerometers. Signals from the accelerometers are input to a microcontroller 80, which then processes the signals and generates a reel control signal 81 that is input to the reel control circuitry 82. The microcontroller 80 may perform diagnostics on the connected accelerometers in addition to reading the data from the accelerometers. The microcontroller uses algorithms to determine when a crash or excessive maneuver motion is occurring, or has occurred, and presents the results to the reel control circuitry 82. In addition, the microcontroller algorithms may include error checking procedures. For example, if a failure is detected in one of the axis accelerometer systems, the microcontroller can be programmed to ignore the data from that axis in computing the reel control signal. As a further error-checking measure, the differences between accelerometer pairs may be compared against a maximum-possible rotational-motion threshold.

The microcontroller algorithms preferably consist of two parts: crash-detection algorithms that evaluate linear acceleration data against threshold values selected from a range of potential crash pulses; and maneuver-detection algorithms that may evaluate both linear and rotational-motion data against predetermined maneuver threshold values. The thresholds are preferably based both on injury criteria in three linear dimensions, as well as the potential for ejection. The latter are affected by physical layout of the workspace, for example, the relative propensity for the occupants to be ejected from the aircraft from accelerations parallel to the floor compared to accelerations perpendicular to the floor.

Another sensor system particularly applicable to airborne applications of the restraint systems is based upon height-over-ground sensing technology. Real time data from such sensors may be used to determine the rate at which an aircraft is closing with the ground, and the time to impact. The sensor data is again preferably read by a microcontroller containing an algorithm that effectively compares the data against threshold values associated with imminent crash. If the threshold values are exceeded, the controller transmits an activation signal to the powered retraction reel. Suitable distance sensing technologies include the collision avoidance radar systems currently available in automobiles worldwide. Other suitable technologies include for example a collision prediction system for military trucks marketed by Eaton Corporation under the name VORAD, a low-cost silicon based chip technology developed by Semiconductor Research Corporation and the University of Florida, and a distance sensing system developed by Ibeo Automotive Systems of Germany that uses laser technology.

Systems based on height over ground sensing have the ability to detect a crash before it occurs, potentially by as much as several seconds. In the time between detection and crash, the power retraction device can be effectively utilized to move an out of position occupant to the crash ready position of FIG. 1. Conversely, for accelerometer based systems to detect a situation warranting activation of the power retraction device, the maneuver or crash event must have already begun. There is generally very little time for the restraint system to react, or for that matter to move an occupant any significant distance within the vehicle compartment. Accordingly the microcontroller is preferably programmed to project the amount of time available in which to move an occupant to a crash ready position before a maneuver or crash reaches a safety critical point.

The system preferably also includes sensing capability to determine an occupant's position relative to the retraction reel. In one embodiment the restraint system detects the amount of tensioning strap 7 spooled out from the retraction reel 18 as an indicator of the occupant's relative position in the compartment. An algorithm that takes into account the amount of spooled out strap, as well as the available time window, can then be used to determine whether or not to activate the power retraction device for haul back. The algorithm may additionally take into account, for example, information about the type and severity of the maneuver or crash as derived from the accelerometers. If there is insufficient time for haul back, the power retraction device may be activated at a reduced torque level that is high enough to substantially increase the loading in the tether to an out-of-position occupant, but not high enough to forcefully change the occupant's position. Alternatively the power retraction device may simply not be activated, relying instead on the inertia locking capability.

Energy Absorbing Link

The restraint system of the present invention preferably incorporates an energy absorber (EA) device in order to mitigate the shock loads associated with a vehicle crash or other high impact event. The EA device may be a mechanical device such as a crushable metal tube or link incorporated for example into the trolley or track system, or alternatively a webbing EA device of the type commonly employed in fall arrest systems. In one preferred embodiment the EA device comprises a rip-stitch type webbing EA incorporated into the straps of the restraint system 1, preferably serving as the upper tether 4 of restraint system 1.

Figure 11:
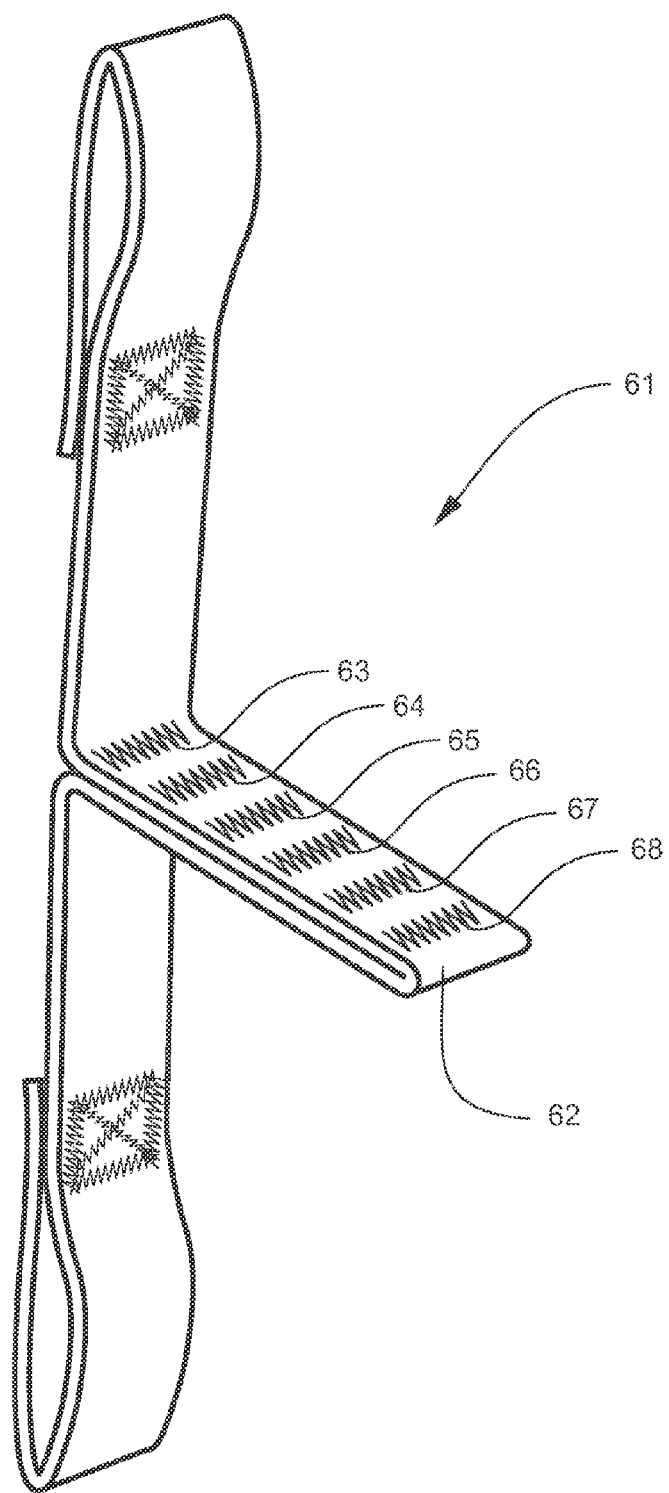
FIG. 11 is an exemplary webbing type energy absorbing device for use in conjunction with the restraint system.

Referring to FIG. 11, an exemplary webbing EA 61 comprises a length of webbing with at least one stitched fold 62. The stitching preferably comprises multiple stitch rows 63-67 running across the width of the webbing, although other stitching directions may be effectively employed. As the webbing is loaded in tension, the stitches resist the load and act to prevent unfolding. The stitch rows 63-67 are preferably designed to remain intact under normal or non-catastrophic operating conditions, and to rupture only when the tension in the webbing exceeds a threshold value typically associated with a vehicle crash or other extremely high loading event. When rupture occurs, the stitch rows fail sequentially, beginning with rupture of row 63, then row 64, and so on. The stitch rows will continue to fail until the tensile load drops below the threshold level, or until all of the stitch rows have failed and the webbing has completely unfolded.

Several design factors affect the EA rupture load and rate. Those factors include the number of stitches per inch (SPI) in each row, the length and height of each row, the stitch pattern, the thread type, and the inter-row spacing, to name a few. In addition, any of the above design factors may be preferentially varied from one stitch row to another, or within stitch rows, to optimize energy attenuation. For example, in one preferred embodiment the number of stitches per inch is increased row-to-row, with an initial value at the first row 63, and incrementally increasing to a maximum value at the last stitch row 67. The result is an increase in the rupture load associated with each successive stitch row, which has the effect of progressively slowing the rupture and unfolding rate in an energy attenuation event. Ideally the stitch rows are configured such that by the time the last stitch row is ruptured, substantially all of the energy of the loading event has been absorbed.

The stroke length of an EA device is largely dependent upon the particular application, and generally speaking a longer stroke is preferable. For example, rip-stitch energy absorbers designed for fall arrest typically utilize multiple stitched folds, with a total stroke of several feet. On the other hand, mechanical EA devices of the type typically incorporated in military vehicle seats may have a stroke of only four inches or less due to space limitations. Similarly in the present case, the effective stroke length of an EA device is largely determined by the fact that the occupant is situated in a vehicle compartment with a floor and ceiling. The stroke length of the EA device is thus preferably as long as possible, without allowing the occupant to sustain injury from impacting the compartment. Of particular concern are "slam down" loading events in which the vehicle compartment is accelerated upward relative to the occupant, such as in a helicopter crash or an under-vehicle mine blast. In one preferred embodiment, an EA webbing device is configured to arrest an occupant's downward relative motion during such an event before the occupant's knees can come into contact with the floor. Accordingly, limiting the stroke of the webbing EA to less than the distance between the compartment floor and an occupant's knees ensures that the occupant's knees will not contact the floor.

Figure 12:
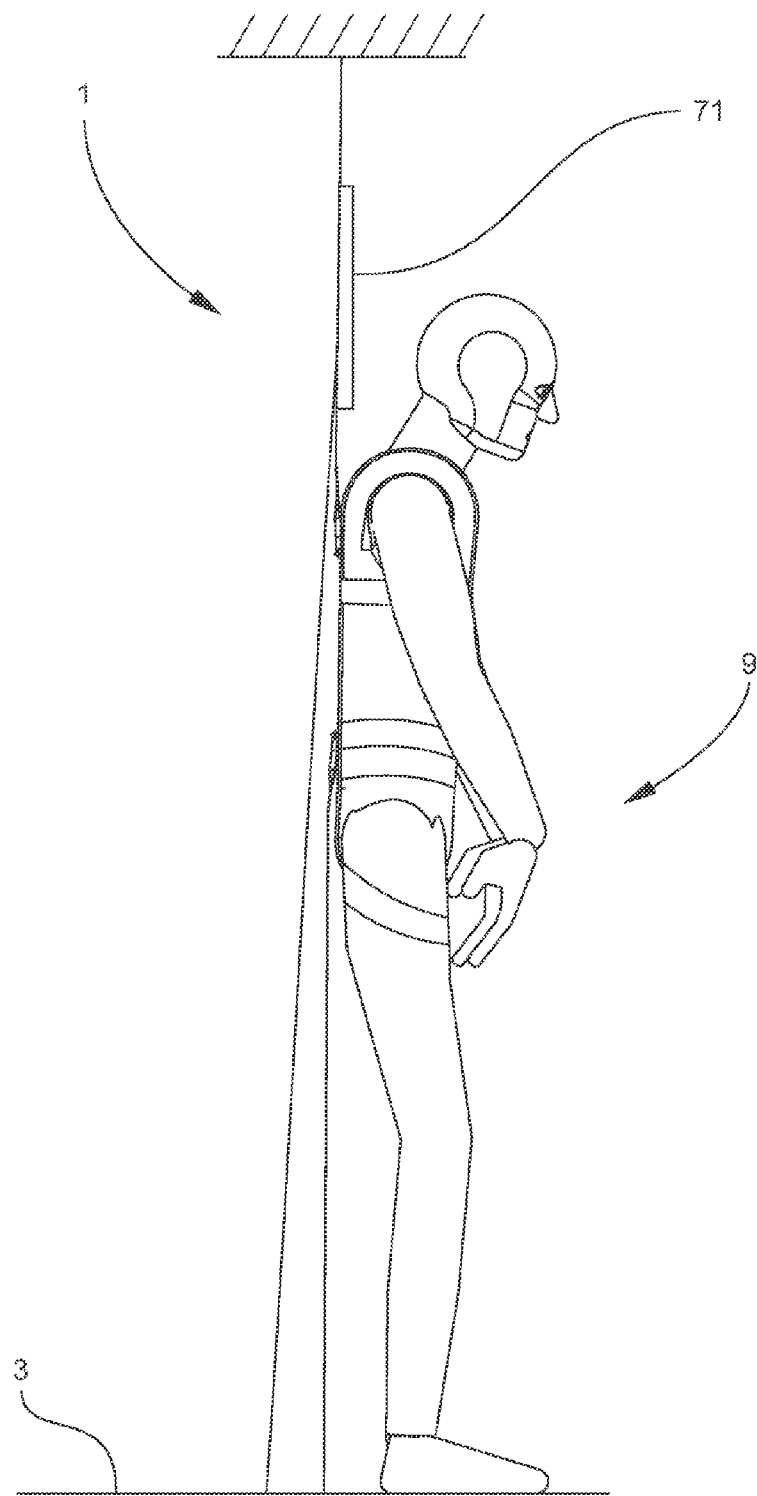
FIG. 12 depicts a standing occupant attached to the restraint system of the present invention.
Figure 13:
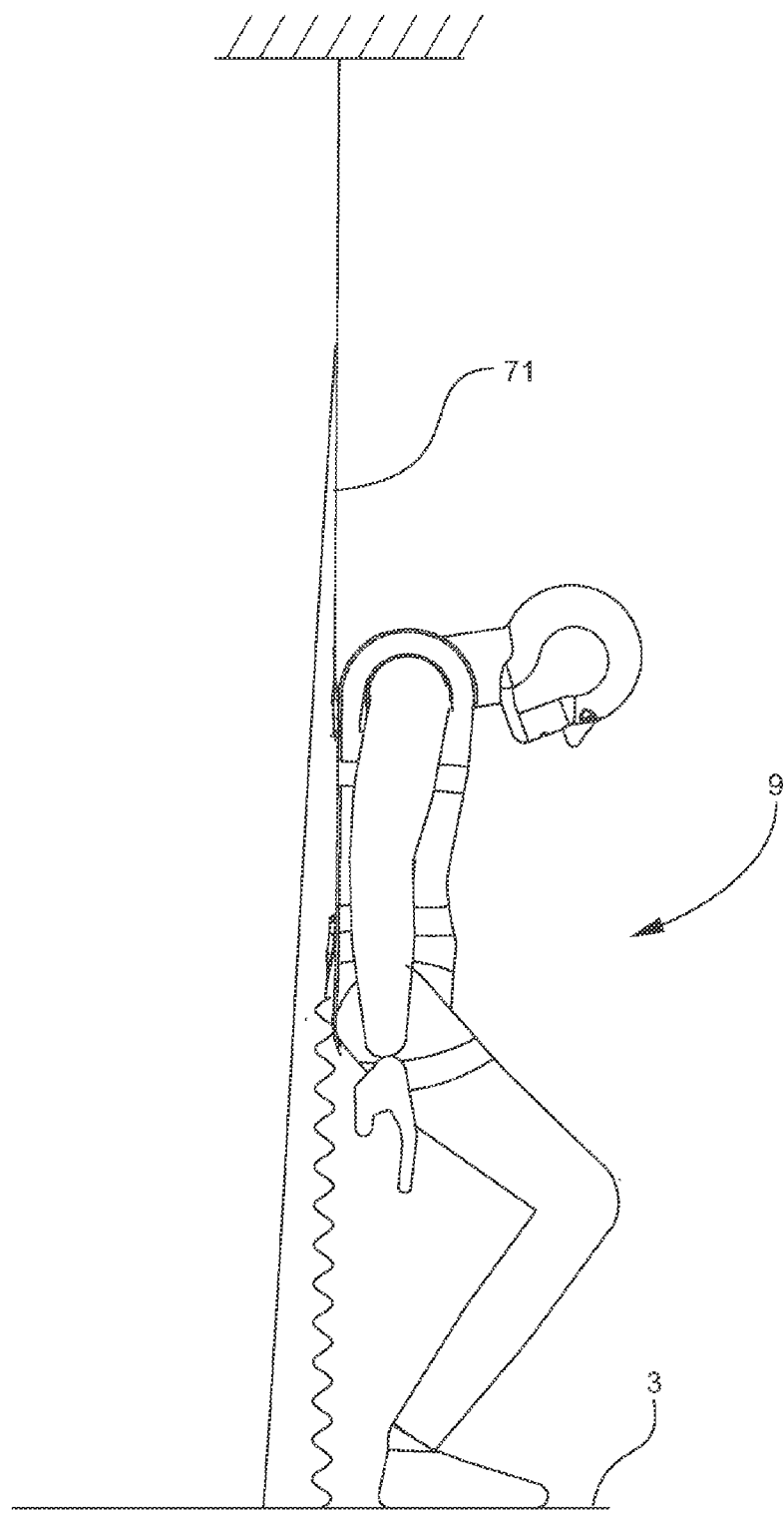
FIG. 13 depicts an occupant attached to the restraint system after a vehicle slam down event, wherein the occupant is in a slouched posture, bent at both waist and knees.
Figure 14:
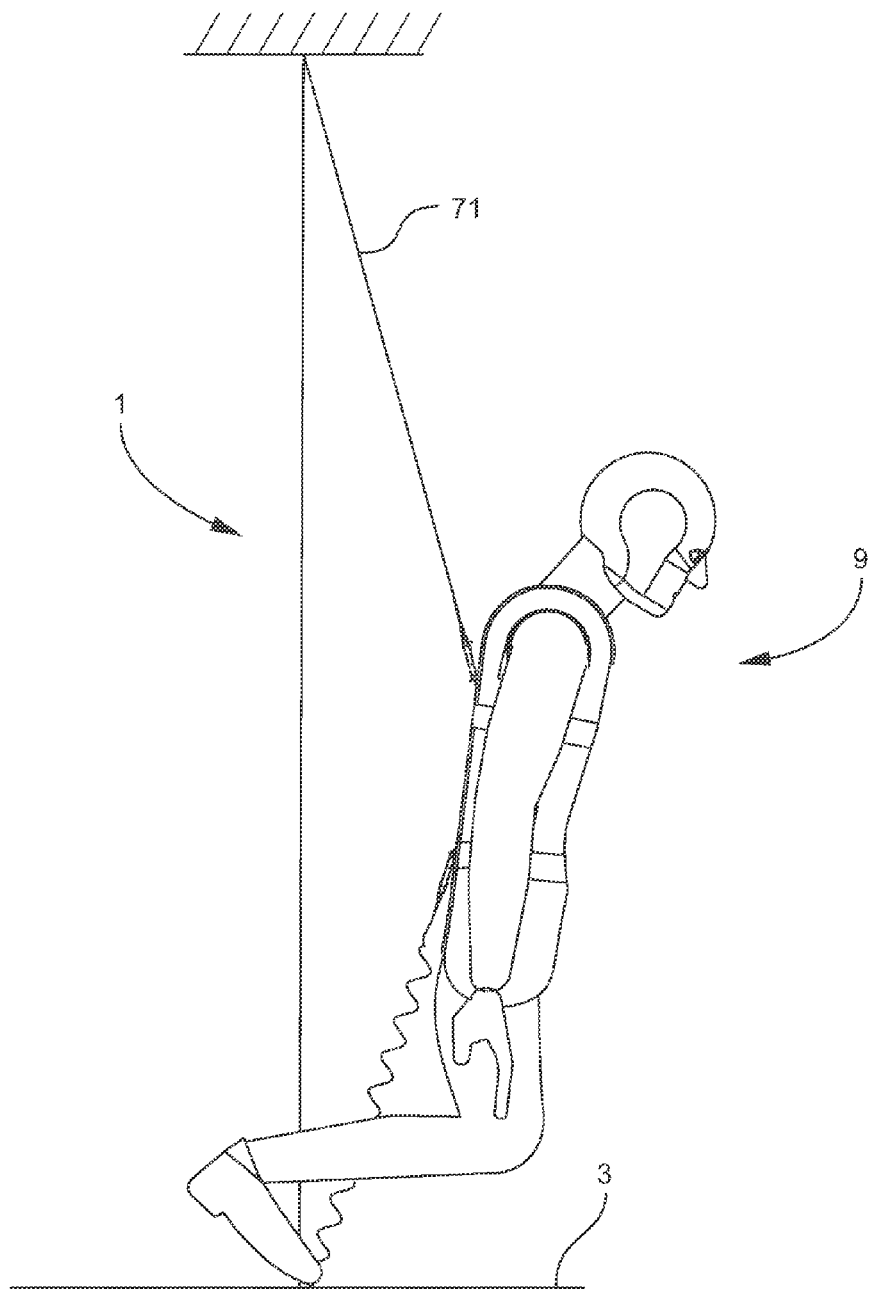
FIG. 14 depicts an occupant attached to the restraint system after a slam down event, wherein the occupant is bent only at the knees, and not in a slouched posture.

Referring now to FIG. 12, an occupant 9 standing on a floor 3 is supported by an exemplary restraint system 1 with a rip-stitch EA device 71 serving as the upper tether. The stroke length of EA 71 is selected to be slightly less than the distance between the floor and the occupant's knee. FIGS. 13 and 14 illustrate the same occupant in two different body positions at the end of a slam down event in which the EA 71 is fully extended. In FIG. 13 the occupant is in a slouched body position, substantially bent over at both the waist and the knees. Only the occupant's feet are touching the floor, while the knees and torso are well above the floor. In FIG. 14 the occupant is bent only at the knees instead of slouched over. The relative motion of the occupant to the compartment has again been arrested by the extended EA before the occupant's knees can reach the floor.

Of course while a particular EA device may perform optimally for occupants within a certain height and weight range, it may be less than optimal for occupants falling outside that range. The present invention accordingly contemplates a restraint system in which the EA device is easily removable and replaceable to allow for use of an appropriately rated EA device for a particular occupant. For example, the attachment points for the EA to the occupant's harness 50 and to tension strap 7 may incorporate a suitable latching clip, such as a D-ring or similar device. Simple loops incorporated at the ends of a webbing EA as depicted in FIG. 11 would thus enable easy installation and removal of the EA device. In one embodiment an assortment of individual webbing EA tethers could be on hand, with each EA tether rated for a particular occupant height and weight range. In another embodiment, a much lower rated EA tether could be configured such that two or more would be required to provide the load capacity needed for a typical occupant. In that case, each of the lower rated EA tethers could be identical with several kept on hand, adding or removing EA tethers as needed for a particular occupant.

Operation

In normal operation the upper and lower trolleys are unlocked, and an occupant attached to restraint system 1 is essentially free to move along the length of tracks 13 and 14. In addition, the occupant is free to move within a certain radius about any particular location of the trolleys, within the limitations imposed by tension strap 7, upper tether 4, and lower tether 5. However in an emergency situation it is desirable that one or both trolleys lock in place to better restrain the occupant and minimize risk of injury. The exemplary trolleys can be locked by pulling downward on the upper trolley, or upward on the lower trolley using the straps of the restraint system. That can occur passively for example in a slam down scenario when the downward relative acceleration of an occupant causes the inertia reel 18 to lock, transferring the entire downward load directly to the upper trolley. The sudden downward load would lock the upper trolley, leaving the lower trolley unlocked however.

The trolleys may also be actively locked in anticipation of, or in response to an emergency situation using the power retraction device. With an occupant in the crash ready position of FIG. 1, tension strap 7 can be retracted further using the power retraction device until the locking strap 6 is pulled tight, thereby simultaneously pulling downward on upper trolley 10 and upward on lower trolley 11. In this condition tethers 4 and 5 are not as tight as locking strap 6, and preferably have some degree of slack. Both trolleys can thus be locked or unlocked by increasing or decreasing the tension in strap 6 accordingly with the power retraction device.

As previously mentioned, activation of the power retraction device for moving an occupant to a crash ready position may be initiated either manually by the occupant, or in response to a control signal from a sensor system. In either case the retraction of strap 7 by the power retraction device preferably continues until the tension in locking strap 6 is enough to lock both trolleys. The system may further include a sensor or switch that deactivates the power retraction device and stops the retraction of strap 7 once the trolleys have locked. Alternatively the powered retraction may remain activated, simply allowing the tension in strap 6 to eventually arrest the retraction.

Swing Seat

Figure 15:
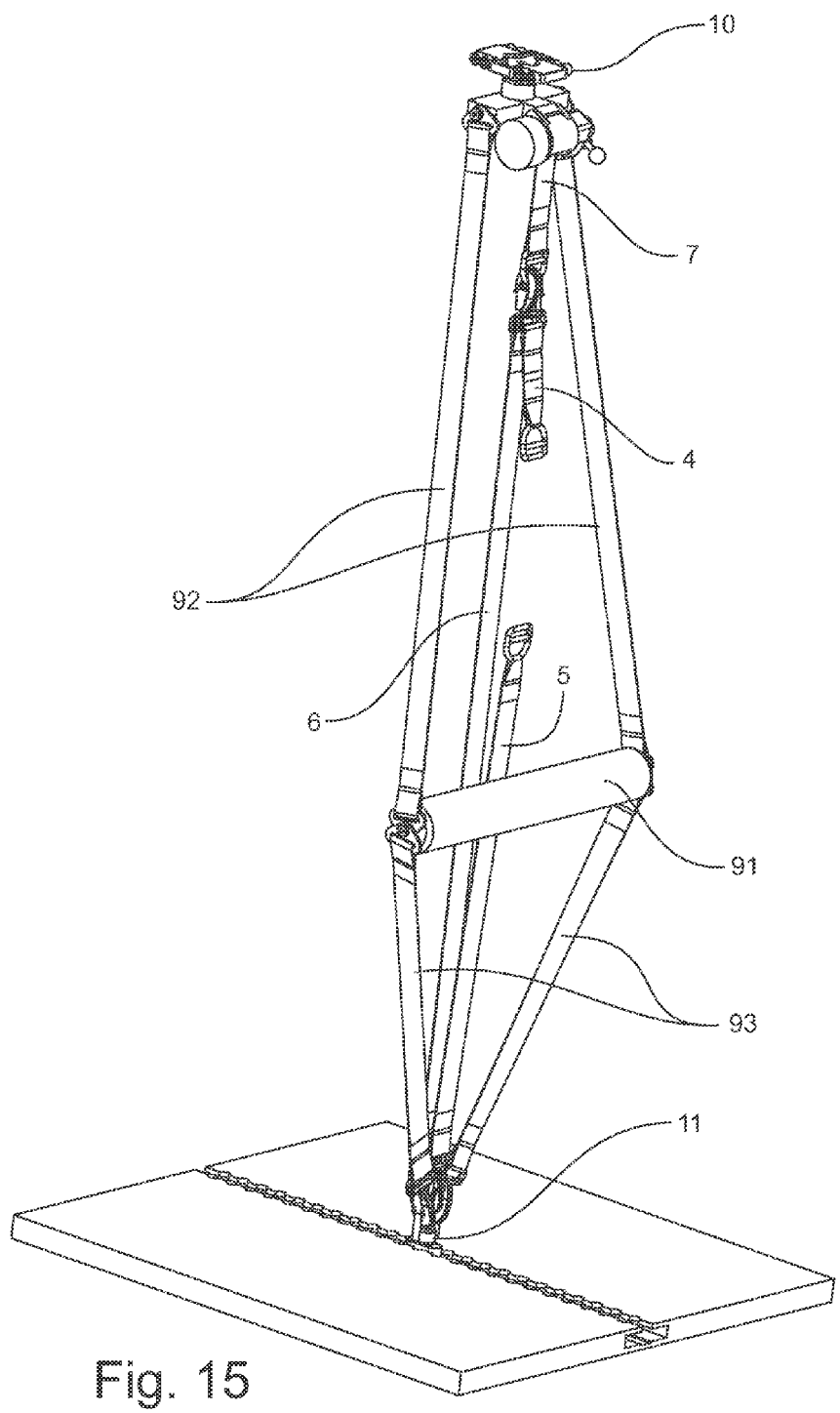
FIG. 15 is a perspective view of the restraint system including a swing seat.
Figure 16:
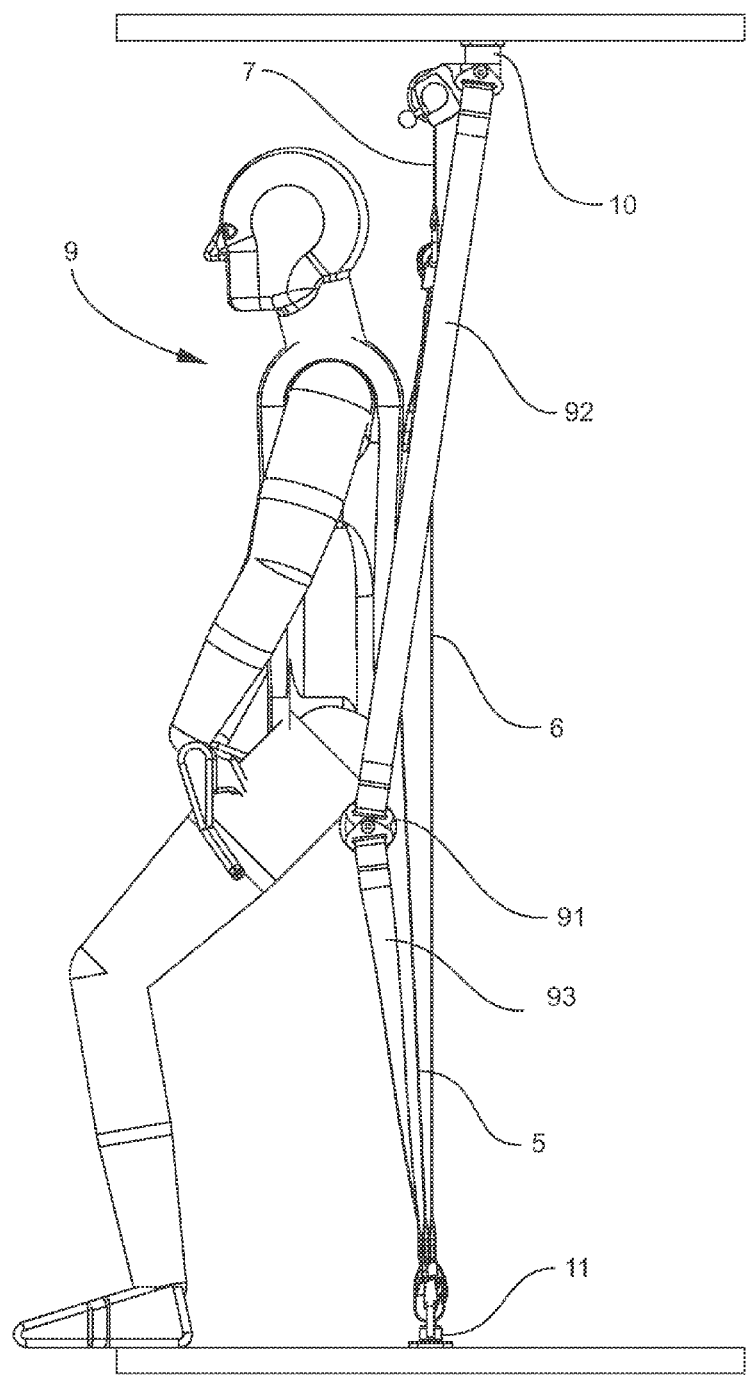
FIG. 16 is a side view of the restraint system and swing seat of FIG. 15, further showing an occupant in a seated position on the swing seat.

Referring now to FIGS. 15 and 16, the restraint system may further comprise a swing seat 91 for supporting an occupant in a seated position. FIG. 15 shows one preferred embodiment of a swing seat 91 with a restraint system 1, where the compartment ceiling is not shown for clarity. In the depicted embodiment, swing seat 91 is a simple padded bar suspended directly from the upper trolley 10 by upper seat straps 92. Lower seat straps 93 connected to lower trolley 11 help prevent the seat from swinging out of position. When an occupant sits down on seat 91 as shown in FIG. 16, the weight of the occupant is transferred by upper seat straps 92 to the upper trolley 10. The upper trolley 10 is preferably designed such that the downward pull from the weight of a typical occupant is more than sufficient to engage the locking mechanism. Thus by simply sitting down on the swing seat, the restraint system is automatically locked into position and prevented by the upper trolley from sliding along the tracks in the compartment. When the occupant stands up, the upper trolley is unloaded and automatically unlocks.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

What is claimed is:

1. A safety restraint system for use by a mobile occupant inside a vehicle compartment, comprising:
   an upper track connected to the ceiling of the compartment;
   an upper trolley connected to and adapted for linear movement along the upper track; and
   an upper tether connected at an upper end to the upper trolley, and connectable at the other end to a harness worn by the occupant.

2. The safety restraint system of claim 1, further comprising a locking inertia reel connected to the upper trolley, the inertia reel including an extensible strap, the end of which is connected to the upper end of the upper tether.

3. The safety restraint system of claim 2, further comprising:
   a lower track connected to the floor of the compartment;
   a lower trolley connected to and adapted for linear movement along the lower track; and a lower tether connected at a lower end to the lower trolley, and connectable at the other end to a harness worn by the occupant.

4. The safety restraint system of claim 3, further comprising a locking strap connected at one end to the end of the inertia reel extensible strap, and at the other end to the lower trolley.

5. The safety restraint system of claim 1, further comprising a power retraction device for powered retraction of the extensible strap.

6. The safety restraint system of claim 5, wherein the power retraction device and inertia reel are one combined system and include a DC electric motor.

7. The safety restraint system of claim 1, further comprising an energy attenuating (EA) device located between the occupant and the ceiling and configured to safely arrest sudden relative acceleration of the occupant away from the ceiling and upper trolley.

8. The safety restraint system of claim 7, wherein the EA device is integrated with the upper tether and comprises a rip-stitch webbing type EA.

9. The safety restraint system of claim 8, wherein the webbing EA comprises one fold tacked together with a plurality of parallel rows of stitches, each row running widthwise across the webbing.

10. The safety restraint system of claim 9, wherein the EA device when unfolded prevents the knees of a tethered occupant from reaching the floor of the compartment.

11. The safety restraint system of claim 4, wherein the upper trolley includes a locking mechanism to lock it in place on the upper track through application of a substantially downward force from a strap of the restraint system.

12. The safety restraint system of claim 11, wherein the lower track comprises an elongated channel in the floor that is open to the vehicle compartment by a groove in the floor down the length of the channel; and wherein the lower trolley resides within the channel, the trolley comprising a body supported by wheels.

13. The safety restraint system of claim 12, wherein the lower trolley is lockable by the application of an upward force to a strap connected to a locking feature of the trolley.

14. The safety restraint system of claim 13, wherein the locking feature is moveable relative to the trolley body and adapted to engage a corresponding receptacle formed in the channel.

15. The safety restraint system of claim 5, further comprising means for manually activating and deactivating the power retraction device.

16. The safety restraint system of claim 15, further comprising a sensor system for detecting an unsafe condition, and a controller for transmitting a control signal to the power retraction device.

17. The safety restraint system of claim 16, wherein the sensor system comprises a height above ground sensor.

18. The safety restraint system of claim 16, wherein the sensor system comprises an accelerometer array.

19. The safety restraint system of claim 3, further comprising a swing seat connected to the upper and lower trolleys.

20. A safety restraint system for use by a mobile occupant inside a vehicle compartment, comprising:
   an upper trolley and track system connected to the ceiling of the vehicle compartment;
   a lower trolley and track system connected to the floor of the floor compartment;
   a lockable inertia reel pivotally attached to the upper trolley, the inertia reel including an extensible strap;
   an upper tether connected at an upper end to the end of the inertia reel extensible strap, and connectable at the other end to a harness worn by the occupant; and
   a lower tether connected at one end to the lower trolley, and connectable at the other end to the harness worn by the occupant.

21. The safety restraint system of claim 20, further comprising a locking strap extending between the upper and lower trolleys.

22. The safety restraint system of claim 21, further comprising a power retraction device for powered retraction of the extensible strap.

23. The safety restraint system of claim 21, further comprising a sensor system for activating the power retraction device.

24. The safety restraint system of claim 20, further comprising a swing seat suspended from the upper and lower trolleys.

25. The safety restraint system of claim 20, wherein the lower track comprises an elongated channel in the floor that is accessible to the vehicle compartment by a groove in the floor down the length of the channel; and wherein the lower trolley resides within the channel.

26. The safety restraint system of claim 20, further comprising an energy attenuating (EA) device located between the occupant and the ceiling and configured to safely arrest sudden relative acceleration of the occupant away from the ceiling and upper trolley.

27. An energy attenuating safety restraint system for use by a mobile occupant inside a vehicle compartment, comprising:
   an upper track connected to the ceiling of the compartment;
   an upper trolley connected to and adapted for linear movement along the upper track;
   an upper tether connected at an upper end to the upper trolley, and connectable at the other end to a harness worn by the occupant; and
   an energy attenuating (EA) device disposed between the occupant and the ceiling of the vehicle compartment.

28. The energy attenuating safety restraint system of claim 27, wherein the EA device is integrated with the upper tether and comprises a rip-stitch webbing type EA.

29. The energy attenuating safety restraint system of claim 28, wherein the stitching pattern of the EA device is configured to incrementally increase the stitch ripping load as the EA unfolds.

* * * * *